US012032666B2

United States Patent
Moreno

(10) Patent No.: US 12,032,666 B2
(45) Date of Patent: Jul. 9, 2024

(54) WEARABLE DEVICES AND RELATED SYSTEMS FOR AUTHENTICATING A USER WITH SURFACE ELECTROMYOGRAM (sEMG)-SIGNALS

(71) Applicant: Capital One Services, LLC, McLean, VA (US)

(72) Inventor: Jose Antonio Moreno, Berkeley, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 153 days.

(21) Appl. No.: 16/826,613

(22) Filed: Mar. 23, 2020

(65) Prior Publication Data
US 2021/0294881 A1    Sep. 23, 2021

(51) Int. Cl.
*H04L 29/06*      (2006.01)
*G06F 1/16*      (2006.01)
(Continued)

(52) U.S. Cl.
CPC .............. *G06F 21/32* (2013.01); *G06F 1/163* (2013.01); *G06F 21/35* (2013.01);
(Continued)

(58) Field of Classification Search
CPC ....... H04W 12/06; H04W 12/68; H04W 4/80; H04L 63/0861; G06F 21/163; G06F 21/32; G06F 21/35; G06F 1/163
See application file for complete search history.

(56) References Cited

U.S. PATENT DOCUMENTS

| 6,720,860 B1 | 4/2004 | Narayanaswami |
| 8,922,481 B1 | 12/2014 | Kauffmann et al. |

(Continued)

FOREIGN PATENT DOCUMENTS

| EP | 2385450 A1 | 9/2011 |
| KR | 200120590 Y1 | 8/1998 |

OTHER PUBLICATIONS

Suresh, M. et al., "Electromyography Analysis for Person Identification," International Journal of Biometrics and Bioinformatics (IJBB), vol. 5, Issue 3, 2011 (8 pages).
(Continued)

*Primary Examiner* — Joseph P Hirl
*Assistant Examiner* — Chi D Nguy
(74) *Attorney, Agent, or Firm* — TROUTMAN PEPPER HAMILTON SANDERS LLP; Christopher J. Forstner; John A. Morrissett

(57) ABSTRACT

Before or after a first-type authentication has been completed, disclosed devices, systems, and methods may conduct a second-type authentication to authenticate a user such that the user can log into a secure device and/or access secure content. An example system may cause a wearable device to activate a biosensor, which extends along a full internal circumference of the wearable device when worn, to detect at least a first sEMG signal on the user's skin responsive to the user performing a first gesture. The system may also generate or receive a first user signature based on the first sEMG signal and determine whether the first user signature matches stored authentication training data. In response to determining that there is a match, the system may complete the second-type authentication to authenticate the user.

23 Claims, 12 Drawing Sheets

(51) Int. Cl.
  *G06F 21/32*   (2013.01)
  *G06F 21/35*   (2013.01)
  *H04L 9/40*    (2022.01)
  *H04W 4/80*    (2018.01)
  *H04W 12/06*   (2021.01)
  *H04W 12/68*   (2021.01)

(52) U.S. Cl.
  CPC ........... *H04L 63/0861* (2013.01); *H04W 4/80* (2018.02); *H04W 12/06* (2013.01); *H04W 12/68* (2021.01)

(56) References Cited

U.S. PATENT DOCUMENTS

| | | | |
|---|---|---|---|
| 9,811,648 | B2 | 11/2017 | Choi et al. |
| 10,366,599 | B1* | 7/2019 | Hodge ............... G08B 21/0269 |
| 11,227,060 | B1* | 1/2022 | John ..................... G06F 21/606 |
| 11,482,043 | B2* | 10/2022 | Nduka .................... G06F 21/32 |
| 2014/0165185 | A1 | 6/2014 | Lange |
| 2015/0278498 | A1 | 10/2015 | Hong et al. |
| 2016/0065572 | A1* | 3/2016 | Kim ................... H04L 63/0861 726/7 |
| 2016/0267265 | A1* | 9/2016 | Waltermann ............ G06F 3/017 |
| 2016/0324487 | A1* | 11/2016 | Guo ..................... A61B 5/0816 |
| 2017/0091595 | A1* | 3/2017 | Wang ...................... G06F 21/32 |
| 2017/0257761 | A1* | 9/2017 | Rodriguez ............. H04L 67/12 |
| 2018/0317085 | A1* | 11/2018 | Gujjar .................. H04L 63/107 |
| 2018/0365401 | A1 | 12/2018 | Lee et al. |
| 2019/0384901 | A1* | 12/2019 | Osborn .................. G06F 3/017 |
| 2019/0386988 | A1* | 12/2019 | Segura Perales ...... A61B 5/117 |
| 2020/0042089 | A1* | 2/2020 | Ang ........................ G06F 3/016 |
| 2020/0065569 | A1 | 2/2020 | Nduka et al. |
| 2020/0280852 | A1* | 9/2020 | Ortiz .................. H04L 63/0861 |

OTHER PUBLICATIONS

Li, Q. et al., "Enhancing the Security of Pattern Unlock with Surface EMG-Based Biometrics," Applied Sciences, 2020 (15 pages).
Zhang, X. et al., "Hand gesture recognition and virtual game control based on 3D accelerometer and EMG sensors," Proceedings of the 13th International Conference on Intelligent User Interfaces, Jan. 2009 (6 pages).
International Search Report and Written Opinion in related PCT Application No. PCT/US21/20705, dated May 24, 2021.
Castaneda, D. et al., "A review on wearable photoplethysmography sensors and their potential future applications in health care," Int J Biosens Bioelectron (Aug. 6, 2018).
Extended European Search Report in related EP Application No. 21776462.0, mailed Feb. 22, 2024.

* cited by examiner

WEARABLE DEVICES AND RELATED SYSTEMS FOR AUTHENTICATING A USER WITH SURFACE ELECTROMYOGRAM (sEMG)-SIGNALS

FIELD OF INVENTION

Examples of the present disclosure relate to surface electromyogram (sEMG)-based systems and methods for authenticating a user, and more particularly a wearable authentication device and related systems and methods for authenticating a user using sEMG signals from the wearable authentication device.

BACKGROUND

Unlocking secure devices and accessing secure content/accounts (e.g., financial accounts, confidential information, etc.) on those and other devices may be restricted with one or more security measures (e.g., fingerprint recognition, password protection, facial ID, etc.). This restricted access offers a level of security to protect confidential accounts and other information from being accessed and potentially misused by bad actors. While helpful, these security measures often become tedious or even burdensome for users who are not in a convenient position to conduct a fingerprint or facial scan or are trying to keep track of numerous ever-changing passwords across multiple devices and accounts. Further, these security measures are prone to security breaches (e.g., scans and passwords can be replicated and scanning sensors are often unencrypted).

In an effort to boost security to access secure accounts (e.g., financial accounts, VPN access, etc.), some systems have started employing two-factor authentication where a user must pass the first security measure (e.g., password) reflective of "what the user knows" and then provide a temporary code that is sent to the user's device to reflect "what the user has." While providing additional security, this two-factor authentication requires that a user has already unlocked/accessed his device (to access the temporary passcode), is still often tedious and burdensome in satisfying the first security measure, and requires additional time and action from the user to satisfy the second security measure. Further, it is still prone to security breaches when the user's device is taken by a bad actor who can access the temporary passcode.

Accordingly, there is a need for systems and methods for authenticating a user to both unlock secure device(s) and access secure content/accounts that provide improved security and convenience to the user. Examples of the present disclosure are directed to these and other considerations.

SUMMARY

Examples of the present disclosure comprise wearable devices and related systems and methods for authenticating a user with surface electromyogram (sEMG) signals.

Consistent with the disclosed embodiments, various devices, methods, and systems are disclosed. In one example, a system may be configured to perform a method for authenticating a user to unlock a user device (e.g., smart phone, laptop, etc.) or allow the user to access secure content on the user device. The system may operate in conjunction with a wearable device that is in short-range contactless communication with the user device and being worn on an appendage (e.g., arm, wrist, finger, leg, etc.) of the user. The system may receive, from the user device, a confirmation that a first-type authentication has been completed. In response, the system may cause the wearable device to activate a first biosensor configured to detect at least a first surface electromyogram (sEMG) signal on the user's skin. The sEMG signal may be generated by a first muscle proximate the wearable device and in response to a first movement of the first muscle to perform a first gesture. Optionally, the wearable device and/or associated user device may provide instructions for the user to perform the first gesture. The system may also receive a first user signature generated based on the first sEMG signal from the user device and determine whether the first user signature matches stored authentication training data beyond a predetermined threshold. In response to determining that the first user signature matches stored authentication training data beyond a predetermined threshold, the system may complete a second-type authentication (e.g., fingerprint recognition, password protection, facial ID, etc.), which differs from the first-type authentication, to authenticate the user on the user device. With each successful authentication, the system may also update stored authentication training data for use in subsequent authentication to (i) increase accuracy and security and (ii) accommodate evolving sEMG signals of the user.

In another example, a wearable authentication device and related system may employ multi-factor authentication to provide the user with access to (i.e., unlock) the wearable device. For example, the wearable authentication device may include a body including a display on an outer-facing surface, and an inner-facing surface opposite the outer-facing surface. The device may additionally include a strap connected to the body and configured to allow the device to be securely fastened to a wrist or other appendage of a user. The device may include at least two input sensors. The first input sensor may include a biosensor configured to detect a surface electromyogram (sEMG) signal from a muscle proximate the biosensor. The second user input sensor may be configured to detect a second-type user authentication that is different from the sEMG authentication. The device may be configured to detect a sEMG signal with the biosensor and generate a user signature based on the sEMG signal. The device may provide the user signature to a user device associated with the wearable authentication device. In response, the wearable authentication device may receive an indication from the user device that the user signature generated from the sEMG matches a stored user signature and complete the sEMG authentication. After sEMG authentication, the wearable device may prompt the user to complete the second-type user authentication to provide access to the wearable authentication device.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example examples of the disclosed technology, examples of which are illustrated in the accompanying drawings and disclosed herein. Wherever convenient, the same references numbers will be used throughout the drawings to refer to the same or like parts.

Figure 1A:
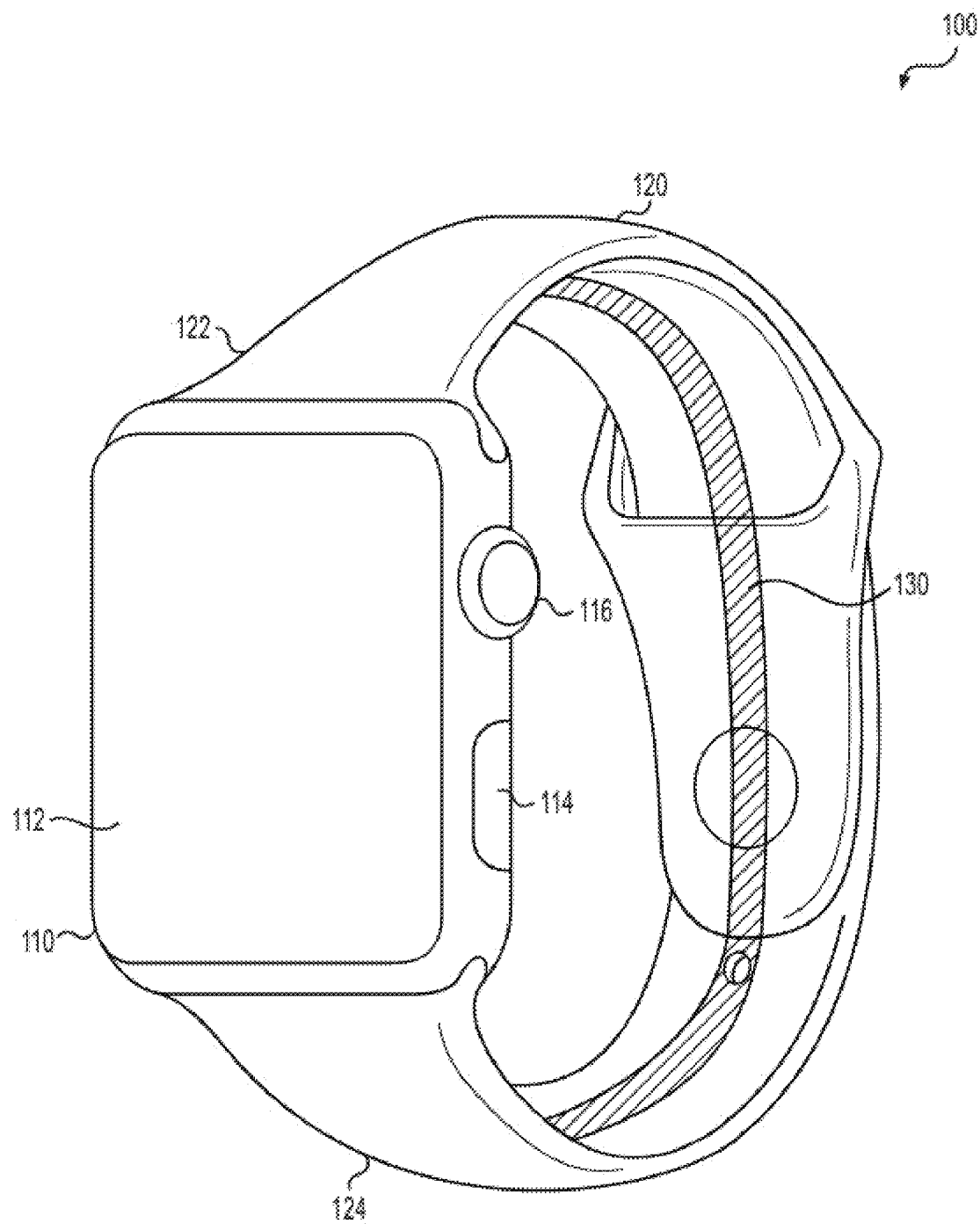
FIGS. 1A-1B are isometric front and rear views of a wearable authentication device consistent with some examples of the present disclosure.
Figure 1B:
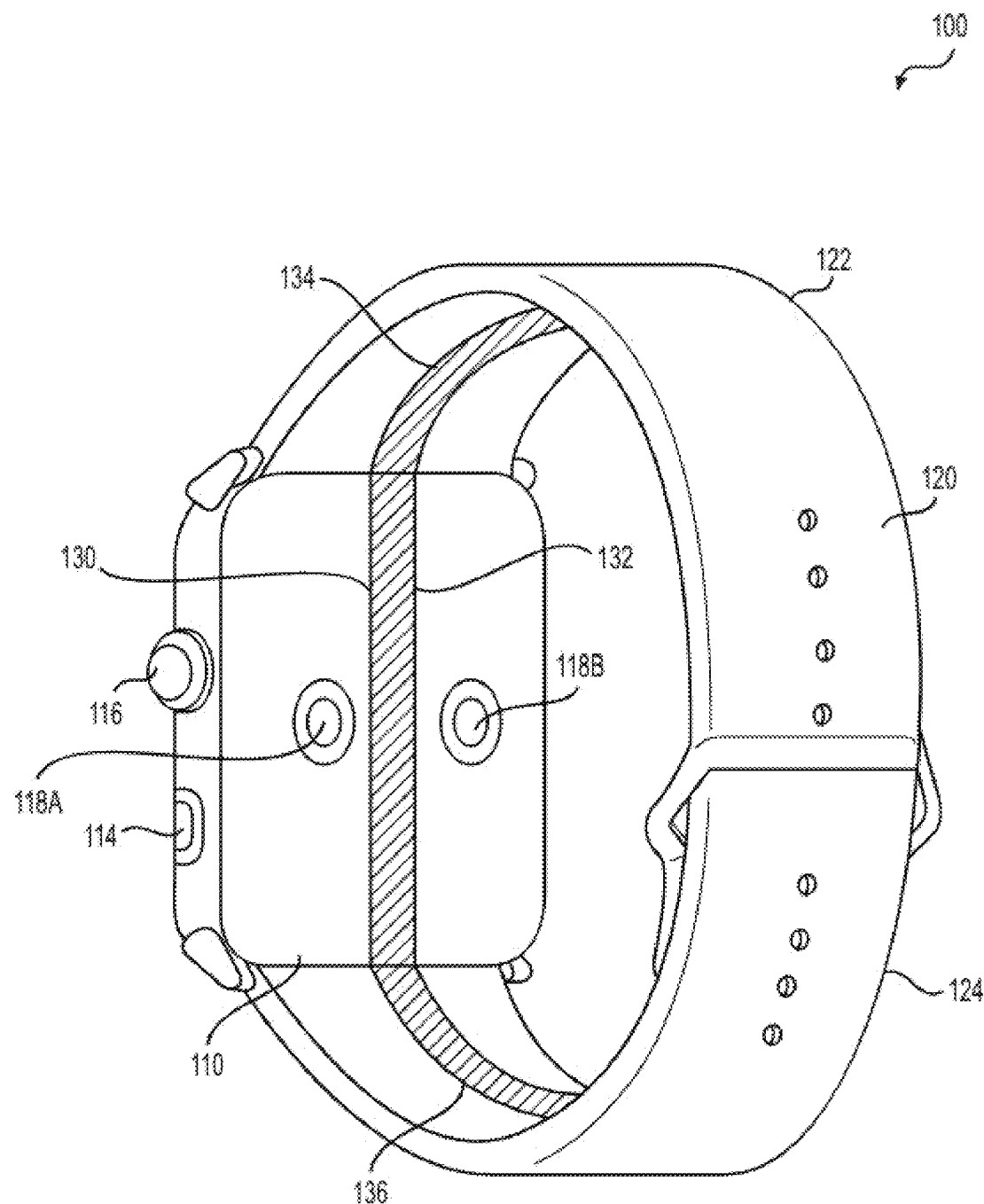
Figure 2A:
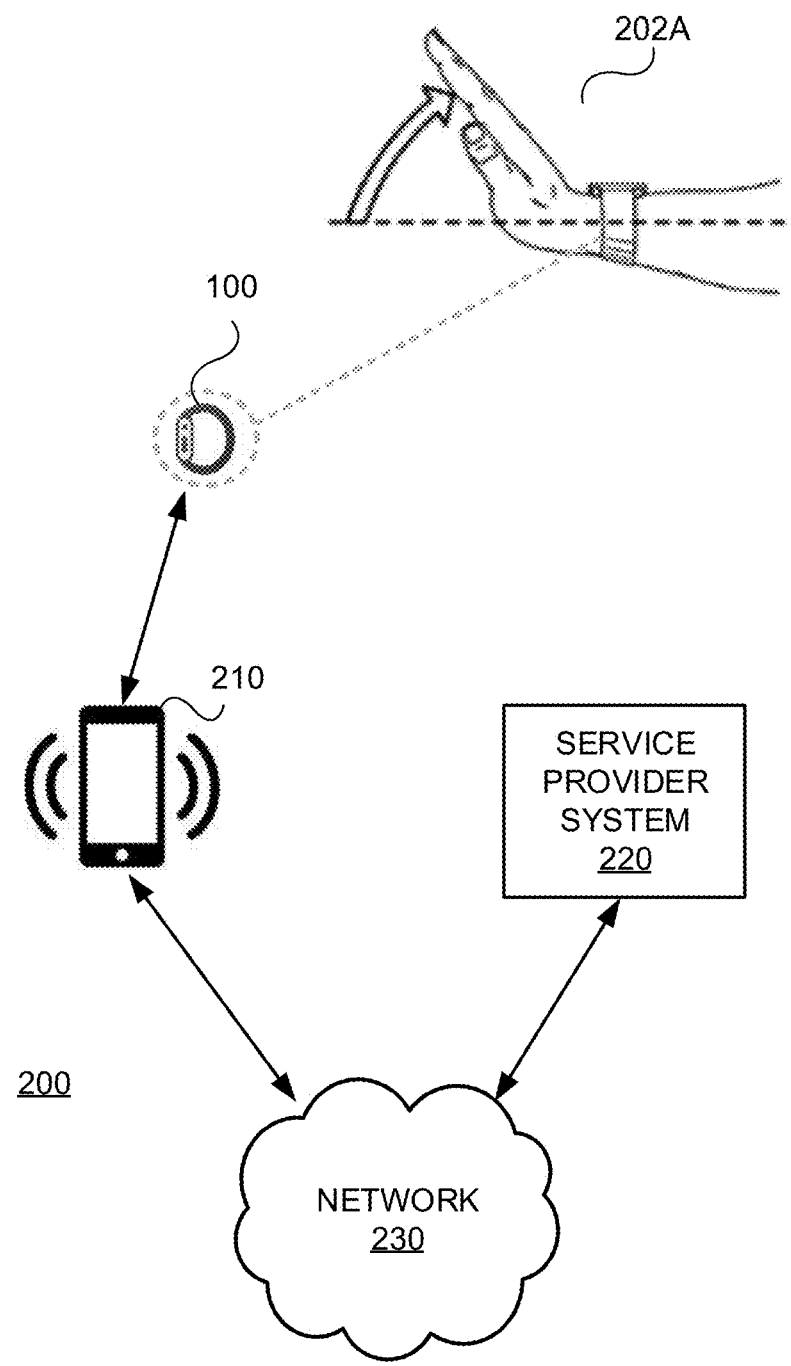
FIGS. 2A-2D are system diagrams of an example multi-factor authentication system for authenticating a user who is wearing a wearable authentication device and performing exemplary gestures, consistent with some examples of the present disclosure.
Figure 2B:
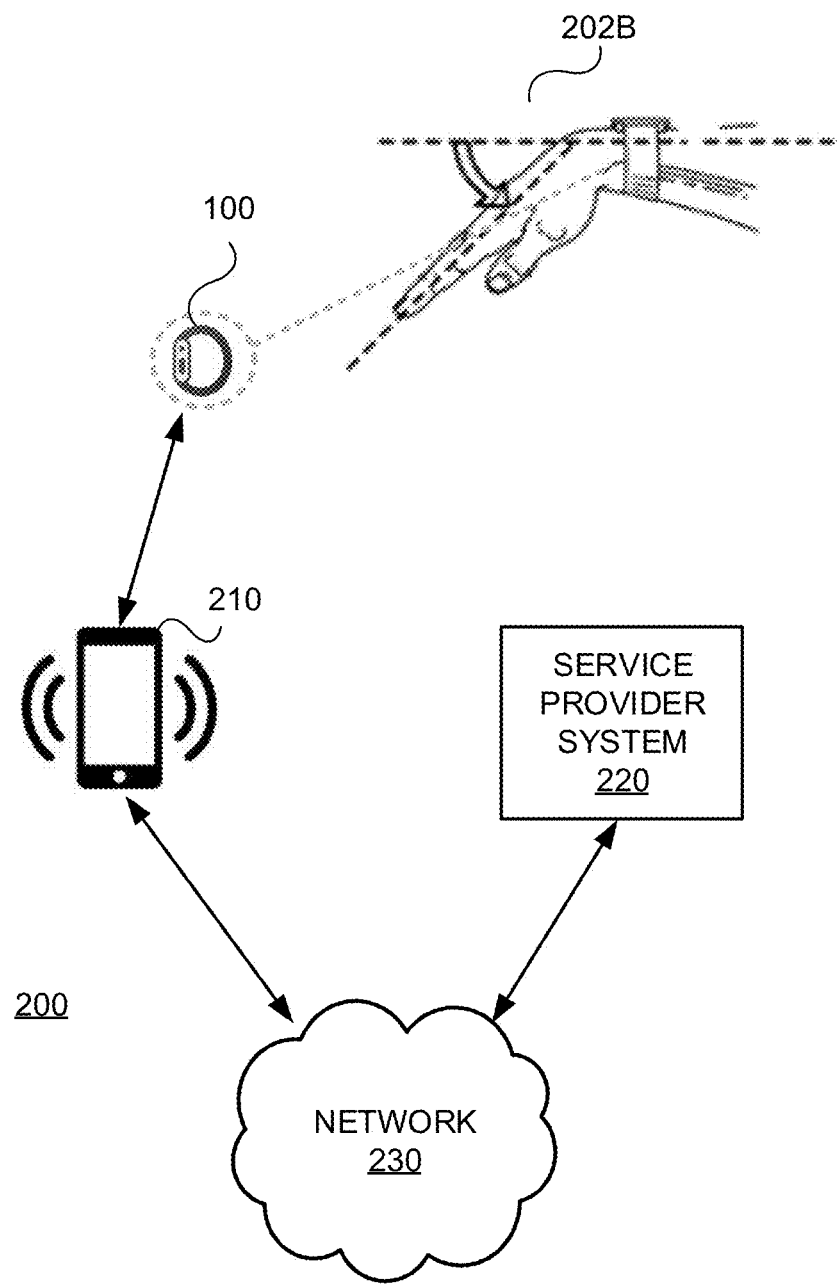
Figure 2C:
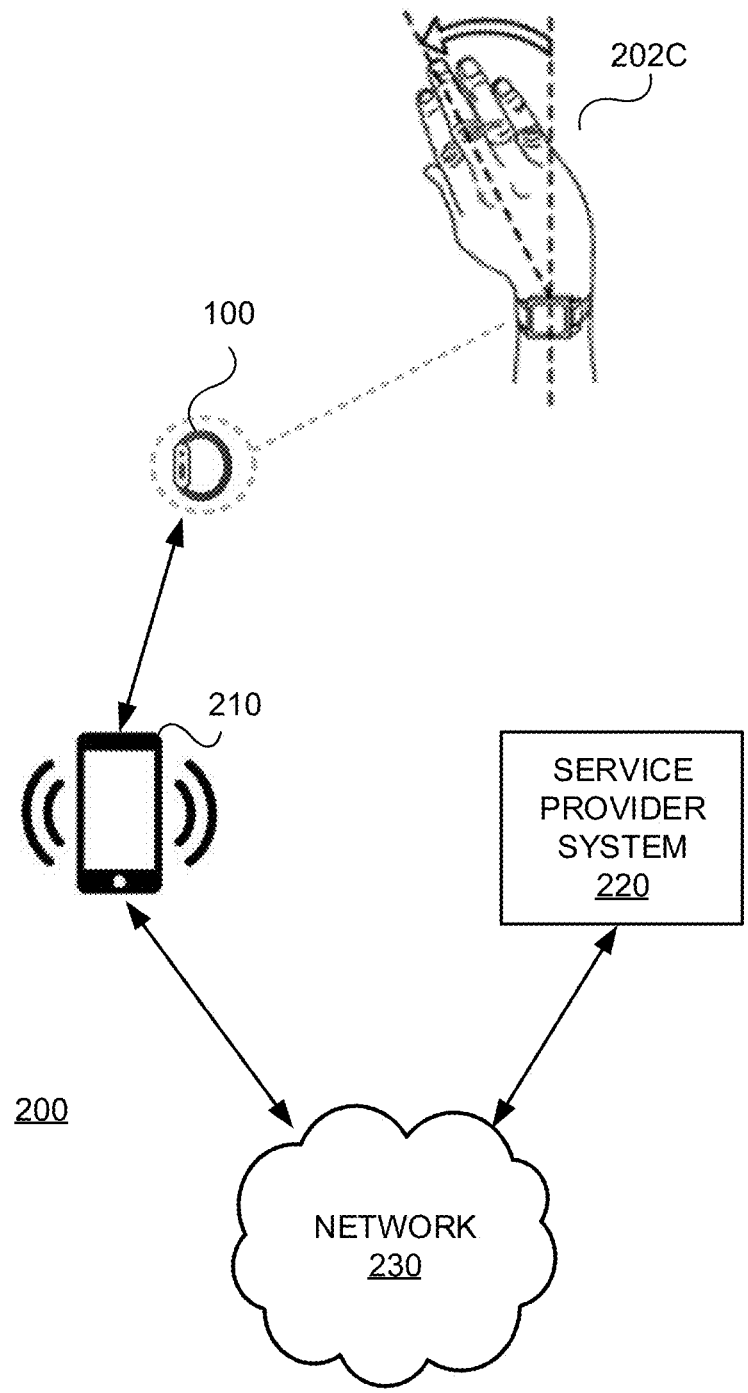
Figure 2D:
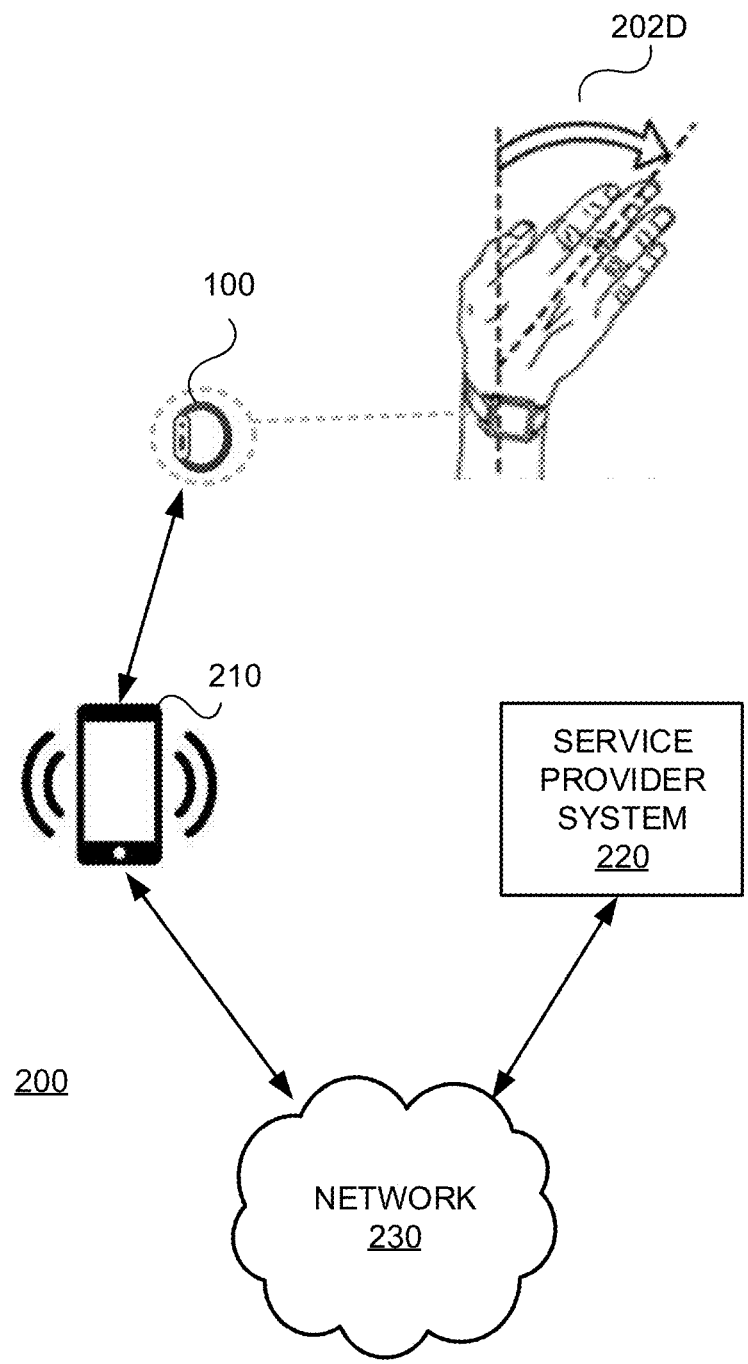

FIG. 1A-1B are front and rear isometric views of a wearable authentication device 100, in accordance with some exemplary embodiments. As shown in FIG. 1A, the wearable authentication device 100 may be configured to be worn on an appendage (e.g., arm, wrist, finger, leg, etc.) of a user and have a body 110, a strap 120, and one or more biosensors 130 that are configured to contact and detect surface electromyogram (sEMG) signals on the user's skin when the wearable authentication device 100 is being worn.

The body 110 may have a display 112, a first user input 114, a second user input 116, heartrate sensor(s) 118A-B. The display 112, which may be a touch-screen display, faces outwardly when the wearable authentication device 100 is in a worn configuration and can selectively display information for viewing by the user. The first and second user inputs 114, 116 may be pushable or selectable buttons or other user input mechanisms that allow the user to provide input to the wearable authentication device 100. Opposite the display 112, as more clearly shown in FIG. 1B, a back face of the body 110 includes the heartrate sensor(s) 118A-B. The heartrate sensors 118 may include one or more optical components configured to measure a heartrate using photoplethysmography ("PPG") to measure a heartrate of a user. The heartrate sensors may have an optical emitter, which, in some embodiments, may have at least 2 LED's (e.g., an infrared LED and a green LED) that send emit light into the skin of a user, when the wearable authentication device 100 is being worn. The heartrate sensor may emit light of variable wavelength that may be partially absorbed by the user's blood vessels. A portion of the light is reflected back into the heartrate sensors 118, and that portion of the light is measured by an integrated light sensor (e.g., a photodiode sensor) to estimate blood flow and extrapolate heart rate therefrom, according to methods known in the art.

The strap 120 may have various configurations, as a person of skill in the art would recognize from existing watch straps, to allow the user to conveniently secure the wearable authentication device 100 to his or her wrist and adjust the strap 120 to achieve the desired fit. As shown, the strap 120 may include a first strap portion 122 and a second strap portion 124, which each attach to one another at one end and to the body 110 at the opposite end. The strap 120 may include adjustment holes, buttons, hook/latch mechanisms, and the like to attach to one another at the desired fit when worn.

The one or more biosensors 130 may continuously extend along an entire inner circumference of the body 110 and the strap 120 such that at least a portion of the one or more biosensors 130 remains in contact with the user's skin when the wearable authentication device 100 is being worn. The one or more biosensors 130 may include multiple portions (e.g., a first biosensor portion 132, a second biosensor portion 134, and a third biosensor portion 136 as shown) to accommodate the design of the strap 120. With the example strap 120 as shown, the first biosensor portion 132 extends along the length of the backplate of the body 110, the second biosensor portion 134 extends along the length of the first strap portion 122, and the third biosensor portion extends along the length of the second strap portion 124. When the strap portions 122, 124 are attached to one another, so are the portions of the one or more biosensors 130 to collectively form a closed circuit. The one or more biosensors 130 may be configured to detect a sEMG signal from the user's skin. The one or more biosensors 130 may include one or more passive EMG electrodes, and/or one or more active EMG electrodes. The biosensor may be affixed to a users skin proximate a first muscle when the wearable authentication device 100 is in a worn configuration and may detect changes in current associated with a gesture being performed by the first muscle. In addition to an EMG electrode, in some embodiments, biosensors 130 may include a signal amplifier for amplifying the current received by the EMG electrode.

When the wearable authentication device 100 is being worn by the user (e.g., on the user's wrist) and the user performs gestures that engage muscles proximate the location of the wearable authentication device 100, an authentication system 200 authenticates the user based on the detected sEMG signal(s) as shown in FIGS. 2A-2D. The authentication system 200 may include the wearable authentication device 100, a mobile device 210 associated with the user and connected by short-range contactless communication to the wearable authentication device 100, and a service provider system 220 configured to communicate with the mobile device 210 via a network 230. Although not shown, the wearable authentication device 100 may have network connectivity features such that it can communicate with other devices of the authentication system 200 via the network 230. The features of the devices/systems of the system 200 are described in more detail with respect to FIGS. 6-8.

Figure 3:
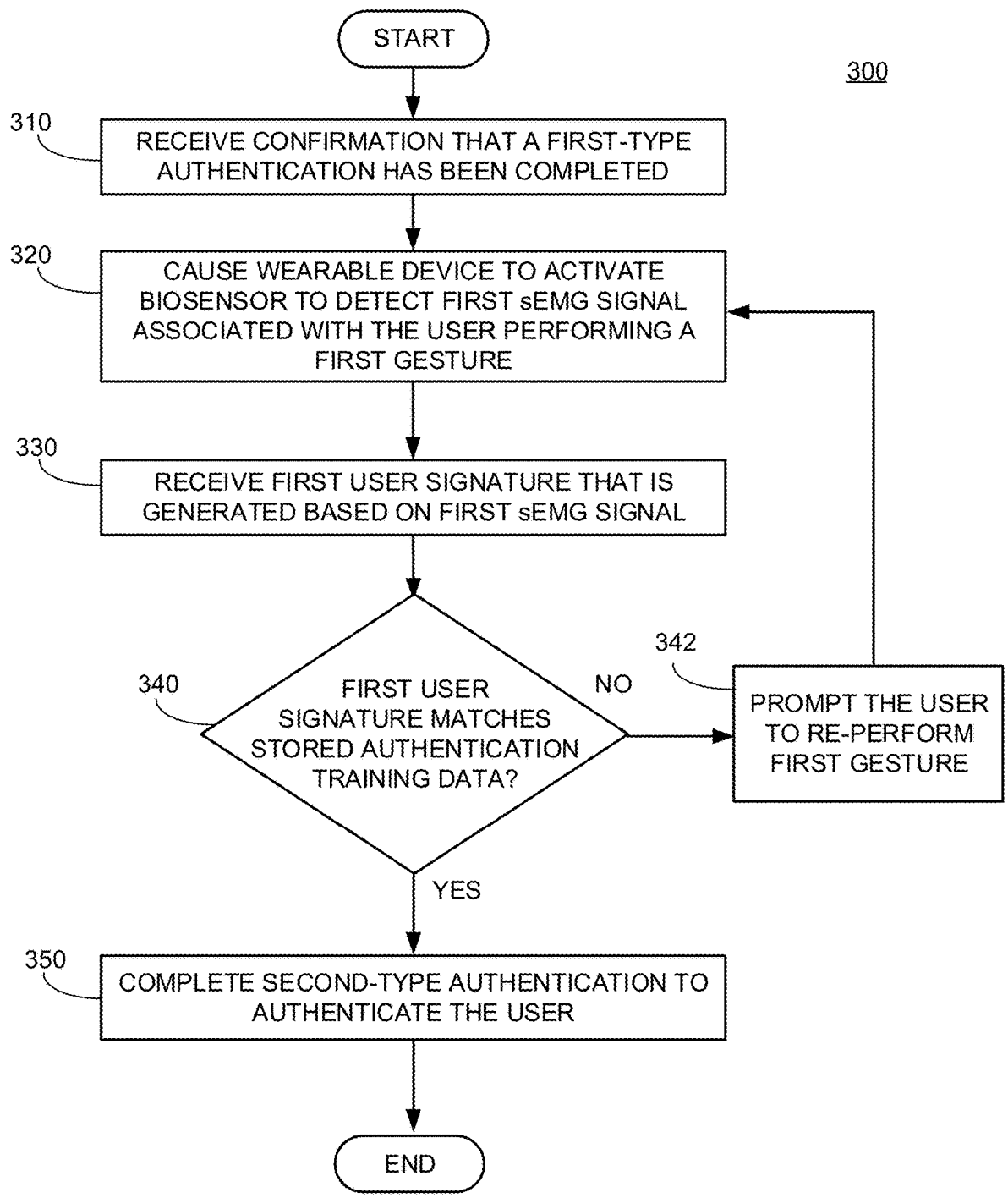
FIG. 3 is a flowchart of a method for authenticating a user to provide access to a secure user device and/or secure content on the user device, in accordance with some examples of the present disclosure.
Figure 4:
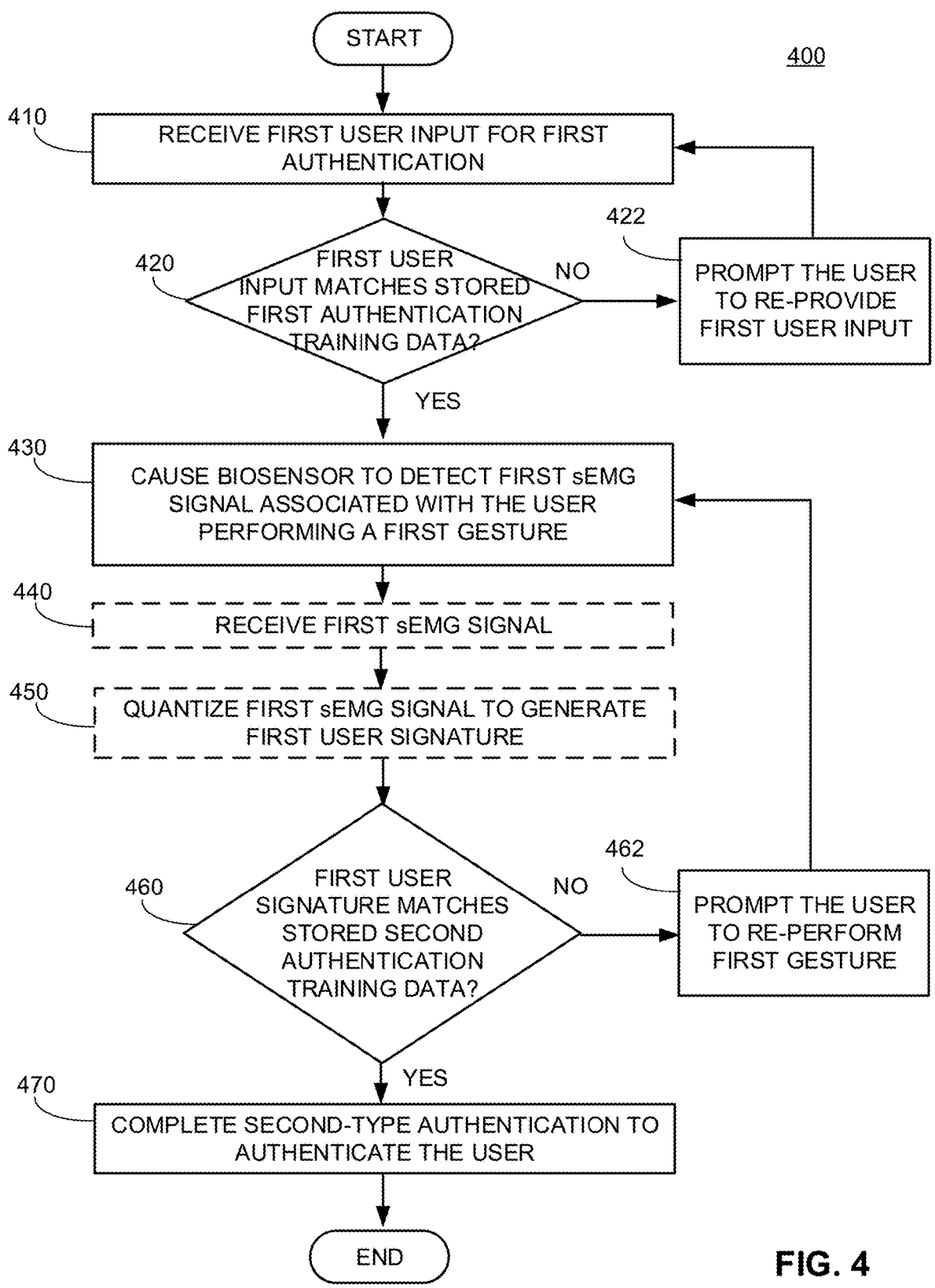
FIG. 4 is a flowchart of a method for authenticating a user to provide access to a secure user device, in accordance with some examples of the present disclosure.
Figure 5:
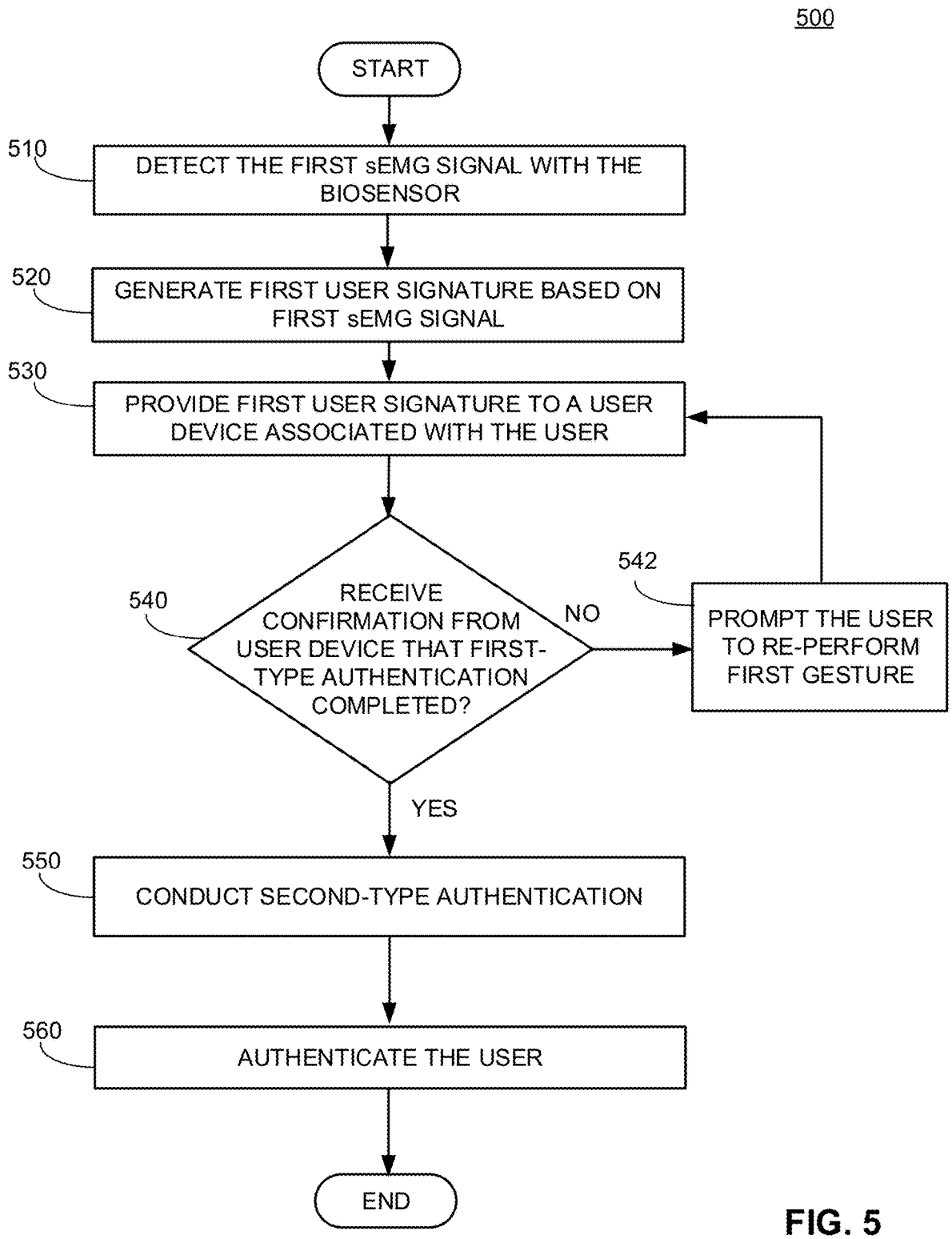
FIG. 5 is a flowchart of a method for authenticating a user to provide access to a secure wearable electronic device, in accordance with some examples of the present disclosure.

Functionally, the system 200 or one or more components therein (e.g., the service provider system 220) may be configured to perform some or all steps of the methods, which are discussed in more detail with respect to FIGS. 3-5, responsive to the user performing certain gestures. For example, the user may angle his hand upwardly relative to the angle of his forearm (gesture 202A in FIG. 2A), downwardly (gesture 202B in FIG. 2B), to the left (gesture 202C in FIG. 2C), and/or to the right (gesture 202D in FIG. 2D), though any gesture or movement or combination of movements that results in muscular activity proximate the position of the wearable authentication device 100 is contemplated. The wearable authentication device 100 may be configured to detect and/or receive an sEMG signal on the user's skin responsive to these or other gestures. After detecting an sEMG signal, the wearable authentication device 100 and/or the mobile device 210 may generate an associated user signature based on the sEMG signal. In some embodiments, the user signature may include a sequence of sampled values from the quantized sEMG signal, and thus a smaller data set than the sEMG signal itself. Because the user signature is a smaller data set than the sEMG signal, generating the user signature locally (e.g., at the wearable authentication device 100 and/or the mobile device 210) results in less network traffic and data usage, quicker communication over the network 230, and may even allow the system 200 to function properly in geographic areas with weaker network connectivity strength (e.g., in remote areas where network connectivity fluctuates in and out such that there are limited time windows to transmit data).

Figure 6:
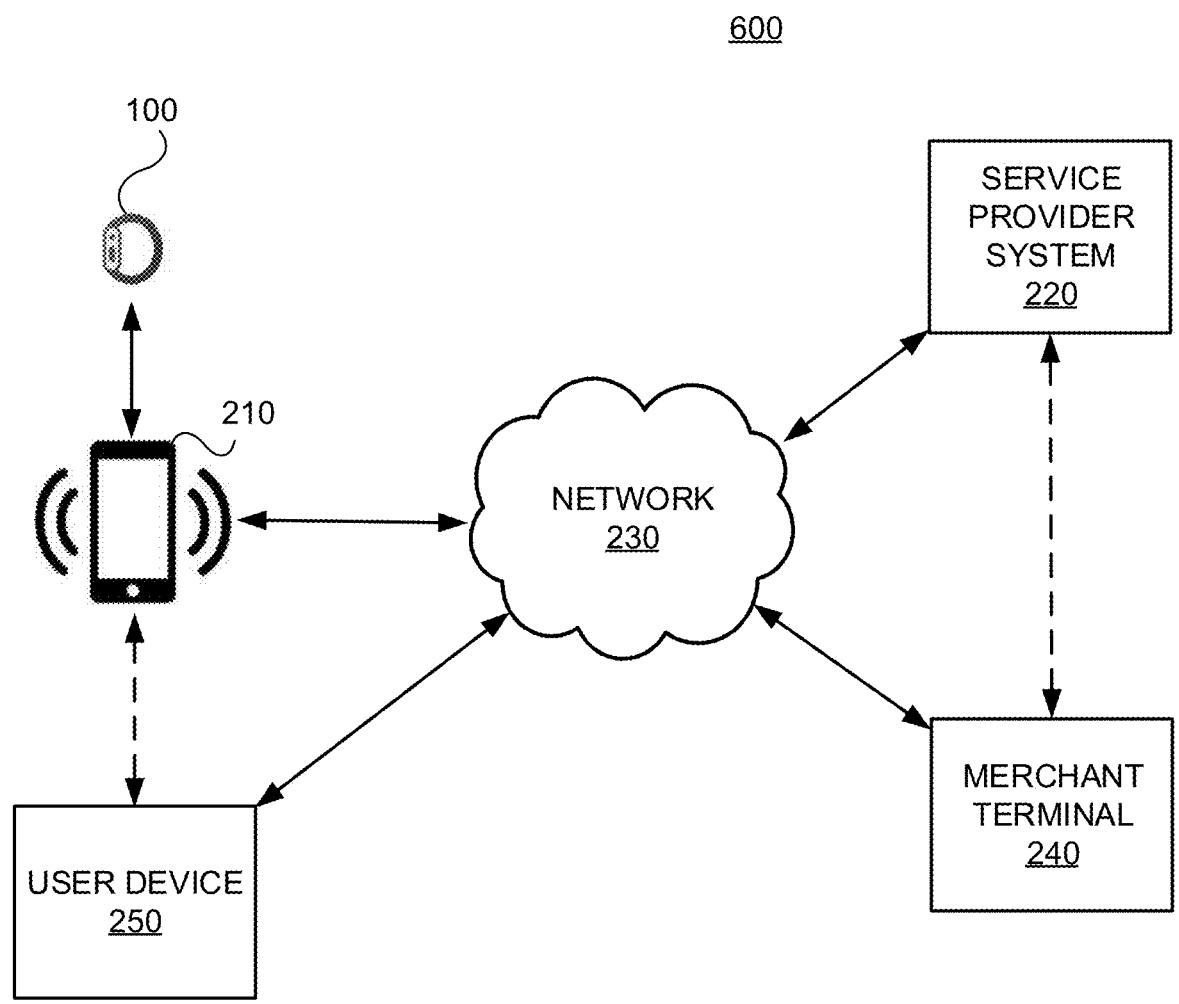
FIG. 6 illustrates an example multi-factor authentication system consistent with some of the disclosed embodiments.

As shown in FIG. 3, the system may be configured to perform a method 300 for authenticating a user on a user device (e.g., mobile device 210 and/or another user device 250 as described in more detail with respect to FIG. 6) or providing access to secure content on the user device, in accordance with some examples of the present disclosure. Although steps in method 300 are described as being performed by the service provider system 220, a person of ordinary skill in the art will understand that some or all of the steps of method 300 may be performed by another component of the system 200 (e.g., the wearable authentication device 100, the mobile device 210, and/or the service provider system 220) or a system 600 (described in more detail with respect to FIGS. 6-8). In step 310, the system (e.g., service provider system 220) may receive confirmation that a first-type authentication has been completed. The first-type authentication may be any type of authentication other than sEMG authentication. For example, first-type authentication may include facial identification, fingerprint biometric identification, voice identification, retinal biometric identification, heartrate identification, motion identification (e.g., by measuring the walking gait of a respective user for authentication), etc., the performance of which would be understood by one of skill in the art. The system may receive the confirmation directly from a device that performed the first-type authentication (e.g., the wearable authentication device 100 or the mobile device 210, depending on which device the user is providing input to) or indirectly through an intermediary device (e.g., via the mobile device 210 if the wearable authentication device 100 performs the first-type authentication and lacks network connectivity).

In step 320, the system (e.g., service provider system 220 and/or mobile device 210) may cause the wearable authentication device 100 to activate a biosensor (e.g., one or more biosensors 130), when not already activated, to detect a first sEMG signal associated with the user performing a first gesture (e.g., one of gestures 202A-D or another predetermined gesture). The wearable authentication device 100 may selectively activate the one or more biosensors 130 to conserve battery life rather than leaving it continuously activated. In other examples, the user may provide input on when and for what duration the wearable authentication device 100 activates the one or more biosensors 130. In some embodiments, the biosensor (e.g. one or more biosensors 130) may be triggered in response to the user opening an application on his/her mobile device (e.g., mobile device 210). In other embodiments, the biosensor may be triggered in response to the user opening the application on the wearable authentication device. In other embodiments, when the user may be using the system to make a purchase at a merchant POS or withdraw funds from an ATM, the biosensors may be activated by a signal sent to the mobile device from the ATM and/or merchant POS over a mobile network. The mobile device may route the signal to the wearable authentication device 100 to activate the biosensors. In some embodiments, the wearable authentication device 100 may have access to the mobile network, and may be capable of receiving the signal from the ATM and/or merchant POS directly.

In step 330, the system (e.g., service provider system 220 and/or mobile device 210) may receive a first user signature that is generated based on the first sEMG signal. In some embodiments, the authentication device 100 may generate the first user signature based on the sEMG signal. In other embodiments, the mobile device 210 may receive the sEMG signal and generate the first user signature based on the sEMG signal. In some embodiments, the user signature may be generated by sampling the sEMG signal in order to determine a respective amplitude of the sEMG signal (i.e., a displacement from rest), which may be defined as the first user signature.

In decision block 340, the system (e.g., service provider system 220) may determine whether the first user signature matches the stored authentication training data beyond a predetermined threshold. For example, if the system determines that the first user signature does not match the stored authentication training data beyond a predetermined threshold, the method may move to step 342. If the system (e.g., service provider system 220), determines that the first user signature matches the stored authentication training data beyond a predetermined threshold, then the method may move to step 350. Once the signal is sampled (i.e. once the first user signature is generated based on the first sEMG signal), first user signature may be represented by a fixed length sequence of numbers representative of respective peaks and valleys of the first sEMG signal. The stored authentication training data may take the same form of a fixed length sequence of numbers representative of respective peaks and valleys of the first sEMG signal. In some embodiments, determining whether the first user signature matches the stored authentication training data beyond a predetermined threshold includes comparing the first user signature to the stored authentication training data by calculating a Euclidean distance between the stored authentication training data and the first user signature and determining a match when the Euclidean distance is under a predetermined threshold.

In step 342, responsive to the first user signature not matching the stored authentication training data, the system (e.g., mobile device 210) may prompt the user to re-perform the first gesture, thereby causing the wearable authentication device 100 to re-activate the biosensor (e.g., the one or more biosensors 130), if not still activated, to detect the sEMG signal associated with the user reperforming the first gesture at step 320. Alternatively, in other examples, the system may determine whether the user has already performed or re-performed the first gesture a predetermined limit of attempts (e.g., one attempt, three attempts, etc.) and, if so, deem that the user has failed the second-type authentication. When the user fails the second-type authentication, the system may take various anti-fraud measures including, for example, communicating with a third party with which the user has attempted to make a financial transaction (e.g. merchant terminal 240). Additionally, the system may send a message to the user device to alert the user of the authentication failure. In some embodiments, the system may use alternative contact information to send the user a message alerting the user about the authentication failure.

In step 350, responsive to the first user signature matching the stored authentication training data, the system (e.g. service provider system 220) may complete the second-type authentication to authenticate the user. In some embodiments, authenticating the user allows the user to access (e.g., log into) the wearable authentication device 100 itself. In other embodiments, authenticating the user allows the user access to another device associated with the wearable authentication device 100, such as the mobile device 210 or another user device 250 (described in more detail with respect to FIG. 6). In yet other embodiments, completing the second-type authentication to authenticate the user may allow the user to access a secured account/content or to make a financial transaction (e.g., via merchant terminal 240, as described in more detail with respect to FIG. 6). In addition to authenticating the user, the system may update the stored authentication training data with the first user signature in some examples. In this manner, the stored authentication training data remains current as the user's sEMG signals change over time, further increasing the security provided by the second-type authentication. After step 350, method 300 may end. It is worth noting that although method 300 is described as performing the first-type authentication before the second-type authentication, they may be performed in either order.

FIG. 4 is a flowchart of a method 400 for authenticating a user to provide access to a secure user device or providing access to secure content on the user device, in accordance with some examples of the present disclosure. Although steps in method 400 are described as being performed by the service provider system 220, a person of ordinary skill in the art will understand that some or all of the steps of method 400 may be performed by another component of the system 200 (e.g., the wearable authentication device 100, the mobile device 210, user device 250, and/or service provider system 220). In step 410, the system (e.g., service provider system 220) may receive a first user input for first authentication. For example, the first user input may be received from the authentication device 100, or from an associated mobile device 210. The first user input may be a biometric face scan, a fingerprint scan, an input of a passcode, or the like. The system (e.g., service provider system 220) may authenticate the user based on matching the first user input to stored first authentication training data associated with the first user. When there is a match beyond a predetermined threshold, the system (e.g., service provider system 220) may authenticate the user. In some embodiments, the system may receive the first user input directly from the device that received the first input from the user (e.g., the wearable authentication device 100 or the mobile device 210, depending on which device the user is providing input to) or indirectly through an intermediary device (e.g., via the mobile device 210 if the wearable authentication device 100 receives the first input and lacks network connectivity).

In decision block 420, the system (e.g., service provider system 220) may determine whether the first user input matches stored first authentication training data. The first authentication training data may include verified user input associated with the first user input. The first user input may include a first method of authentication that is different from an sEMG biometric identification. For example, the first authentication may be a biometric fingerprint scan, a biometric facial scan, a passcode, etc. In some embodiments, the first authentication training data may be stored locally on mobile device 210, or locally on EMG-based wearable authentication device 100. In some embodiments, the first authentication training data may be stored directly on service provider system 220. When the system determines that the first user input does not match the stored first authentication training data, the method may move to step 422. When the system determines that the first user input does match the stored authentication training data, the method may move to step 430.

In step 422, the system (e.g., mobile device 210) may prompt the user to re-provide the first user input. The method may continue from step 410 when the system may receive the re-provided first user input for the first authentication.

In step 430, the system (e.g., mobile device 210 or EMG-based wearable authentication device 100) may cause the biosensor (e.g., one or more biosensors 130), when not already activated, to detect a first sEMG signal associated with the user performing a first gesture (e.g., one of gestures 202A-D or another predetermined gesture). The wearable authentication device 100 may selectively activate the one or more biosensors 130 to conserve battery life rather than leaving it continuously activated. In other examples, the user may provide input on when and for what duration the wearable authentication device 100 activates the one or more biosensors 130. The first gesture may include a series of gestures. The sEMG signal may be detected by the biosensor from a first muscle proximate the biosensor when the EMG-based wearable authentication device 100 is in a worn configuration (e.g., on a user's wrist). The sEMG signal may be generated by the first muscle in response to the user performing the first gesture.

The method may optionally include step 440, in which the system (e.g., mobile device 210) receives the first sEMG signal. In some embodiments, the system does not receive the first sEMG signal, and instead, only a first user signature, based on quantizing the first sEMG signal is received by the system. Advantages of receiving only a first user signature and not the first sEMG signal include decreased bandwidth usage and improved functionality of the network. In some embodiments, the sEMG signal is quantized directly by the wearable authentication device 100 to generate the first user signature, which may then be received by one of the mobile device 210 and/or the service provider system 220.

After optional step 440, the method may include optional step 450 in which the system (e.g., mobile device 210 and/or service provider system 220) may quantize the first sEMG signal to generate the first user signature. Quantizing the first sEMG signal to generate the first user signature may include algorithms known in the art for the compression of sEMG signals. For example, quantizing the first sEMG signal may include transforming the first sEMG signal utilizing a sampling algorithm. In some embodiments, the first user signature includes less data than the first sEMG signal. Because the first user signature may include less data than the first sEMG signal, valuable network bandwidth is saved by quantizing the sEMG signal before transmitting it over a network (e.g., network 230).

In decision block 460, the system (e.g., mobile device 210 and/or service provider system 220) may determine whether the first user signature matches stored second authentication training data. The stored second authentication training data may include verified user signatures associated with the first user based on sEMG signals generated in response to the user performing the first gesture. When the system (e.g., mobile device 210 and/or service provider system 220) determines that the first user signature does not match the stored second authentication training data, the method may move to step 462. When the first user signature matches the stored second authentication training data in step 460, the method may move to step 470.

In step 462, the system (e.g., mobile device 210 and/or wearable authentication device 100) may prompt the user to re-perform the first gesture, thereby causing the wearable authentication device to reactivate the biosensor (e.g., the one or more biosensors 130), if not still activated. When the first gesture is re-performed in step 462, the method may continue from step 430, in which the system may cause the biosensor of the wearable authentication device (described in more detail with respect to FIG. 8) to detect the first sEMG signal associated with the user re-performing the first gesture.

In step 470, in response to the first user signature matching the stored second authentication training data, the system (e.g., mobile device 210 and/or service provider system 220) may complete the second-type authentication to authenticate the user. After step 470, the method may end. In some embodiments, authenticating the user allows the user to access (e.g., log into) the wearable device 100 itself. In some embodiments, authenticating the user may include providing access to a device associated with the wearable device 100 (e.g., mobile device 210) or another user device 250 (described in more detail with respect to FIG. 6). In some embodiments, authenticating the user may include providing the user access to a secured account/content (e.g., hosted by service provider system 220) or providing the user access to a financial account to make a secure financial transaction (e.g., via merchant terminal 240). In addition to authenticating the user, the system may update the stored authentication training data with the first user signature in some examples. In this manner, the stored authentication training data remains current as the user's sEMG signals change over time, further increasing the security provided by the second-type authentication. It is worth noting that although method is described as performing the first-type authentication before the second-type authentication, they may be performed in either order.

FIG. 5 is a flowchart of a method 500 for authenticating a user to provide access to a secure wearable electronic device or providing access to secure content on the user device (e.g., wearable authentication device 100), in accordance with some examples of the present disclosure. Although steps in method 500 are described as being performed by the device (e.g., wearable authentication device 100), a person of ordinary skill in the art will understand that some or all of the steps of method 500 may be performed by another component of the system (e.g., mobile device 210, user device 250, and/or service provider system 220). In step 510, the device (e.g. wearable authentication device 100), may detect the first sEMG signal with the biosensor. In some embodiments, the first sEMG signal is detected in response to a user performing a first gesture (e.g., one of gestures 202A-D or another predetermined gesture) The wearable authentication device 100 may selectively activate the one or more biosensors 130 to conserve battery life rather than leaving it continuously activated. In other examples, the user may provide input on when and for what duration the wearable authentication device 100 activates the one or more biosensors 130. The first sEMG signal may be generated by a first muscle of the user in response to the user performing a first gesture using the first muscle. The first sEMG signal may be detected by the biosensor from the first muscle proximate the biosensor when the wearable authentication device 100 is in a worn configuration (e.g., on a user's wrist). In some embodiments, the first gesture may be a single gesture, or the first gesture may include a series of gestures. In some embodiments, a display of the wearable authentication device 100 may provide the user's with instructions to perform the first gesture in order to complete the authentication process. The instructions may include either written instructions for performing the first gesture, a visual guide to performing the first gesture, or combinations thereof.

Figure 8:
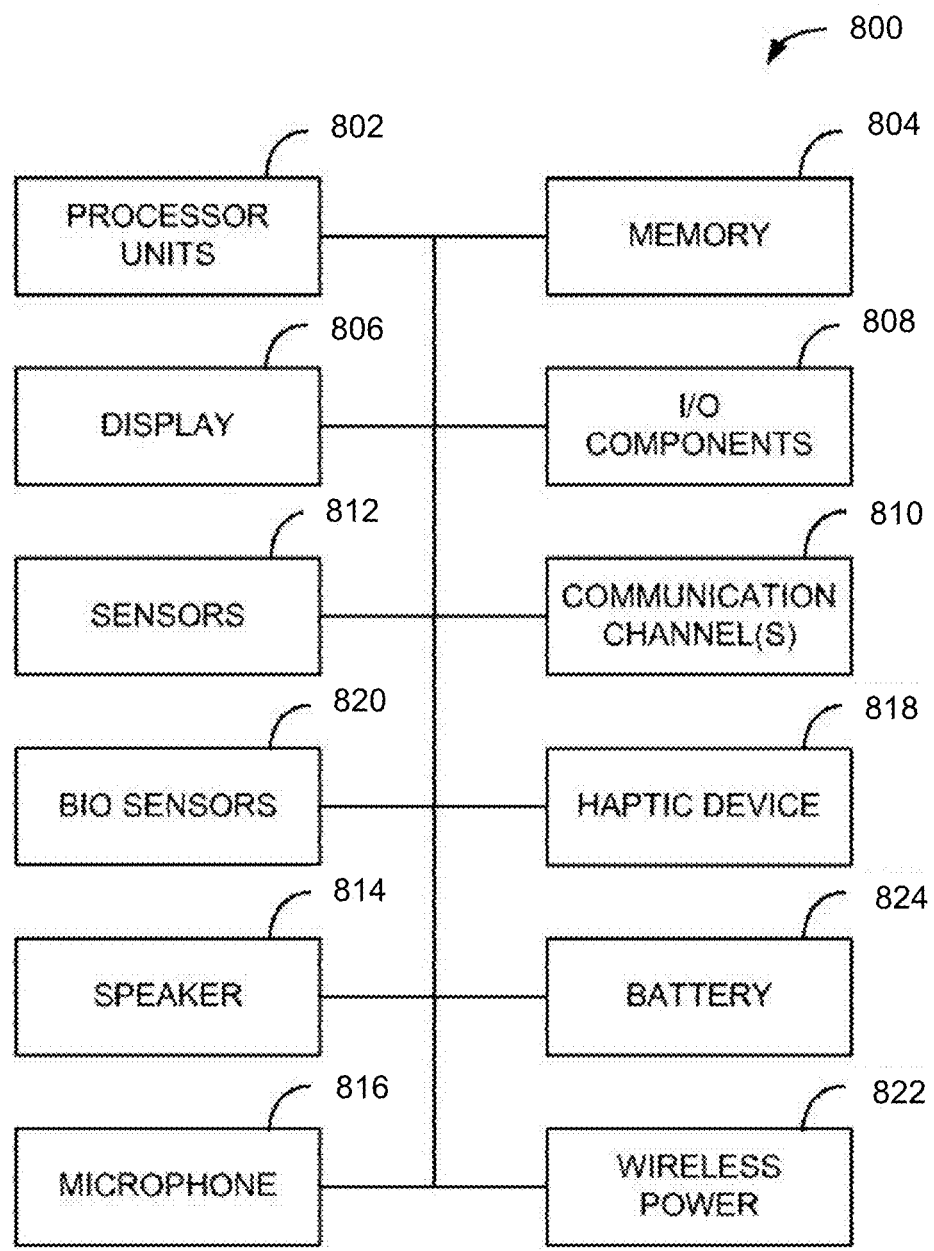
FIG. 8 is a component diagram of the example wearable authentication device consistent with some of the disclosed embodiments.

In step 520, the device (e.g., wearable authentication device 100, described in more detail with respect to FIG. 8) may generate the first user signature based on the first sEMG signal. In some embodiments, generating the first user signature based on the first sEMG signal includes quantizing the first sEMG signal to generate the first user signature. The first user signature may be generated based on the use of algorithms known in the art for the compression of sEMG signals. For example, generating the first users signature from the first sEMG signal may include transforming the first sEMG signal utilizing a sampling algorithm.

In step 530, the device (e.g. EMG-based wearable authentication device 100) may provide the first user signature to a user device associated with the user. Advantages or providing only a first user signature and not the first sEMG signal include decreased bandwidth usage and improved functionality of the network. In some embodiments, the user device associated with the user may be a mobile device (e.g., mobile device 210) that is connected to the device via a short-range contactless communication interface. In some embodiments, the user device associated with the user may be a user device (e.g., user device 250) that is not connected to the device via the short-range contactless communication interface, but instead may be connected to the same local network as the mobile device that is connected to the wearable authentication device 100. In some embodiments, the user device associated with the user may store user signature authentication training data which may allow the user device to determine whether the first user signature matches the stored authentication training data beyond a predetermined threshold, the match indicating confirmation from the user device that a first-type (i.e., based on the sEMG signal) authentication is completed.

In decision block 540, the device (e.g., wearable authentication device 100) may determine whether the first-type (i.e., based on the sEMG signal) authentication is completed based on whether the confirmation from the user device (e.g., user device 250 and/or mobile device 210) is received. When the device does not receive confirmation from the user device that a first-type authentication has been completed, the method may move to step 542 of method 500. When the device receives confirmation from the first user device that the first type authentication has been completed, the method may move to step 550 of method 500.

In step 542, the device (e.g., wearable authentication device 100) may prompt the user to re-perform the first gesture, thereby causing the wearable authentication device to reactivate the biosensor (e.g., the one or more biosensors 130), if not still activated. When the first gesture is re-performed in step 542, the method may continue from step 530, in which the device may provide the first user signature to a user device associated with the user for confirmation that the first-type (i.e., sEMG biometric) authentication has been completed.

In step 550, responsive to receiving confirmation from the user device that the first-type (i.e., sEMG biometric) authentication has been completed, the device may conduct a second-type authentication. The second-type authentication may be conducted directly on wearable authentication device 100 or on a related device (e.g., user device 250 and/or mobile device 210). The related device may be connected to the wearable authentication device 100 by a short-range contactless communication interface (e.g., such as mobile device 210) or the related device may merely be on the same local network as the wearable authentication device 100 (e.g., user device 250). Second-type authentication may include any method of authentication that is different from an sEMG based authentication method. For example, second-type authentication may be based on a biometric fingerprint scan, a biometric facial scan, a passcode, or any other suitable authentication method different from one based on an sEMG signal and/or first user signature.

In step 560, the device (e.g. EMG-based wearable authentication device 100) may authenticate the user. In some embodiments, authenticating the user allows the user access to the wearable authentication device 100. In other embodiments, authenticating the user allows the user access to another device associated with the wearable authentication device 100, such as the mobile device 210 or the user device 250. In yet other embodiments, authenticating the user may allow the user to access a secured account or to make a financial transaction (e.g., via merchant terminal 240). In addition to authenticating the user, the system may update the stored authentication training data with the first user signature in some examples. In this manner, the stored authentication training data remains current as the user's sEMG signals change over time, further increasing the security provided by the second-type authentication. It is worth noting that although method is described as performing the first-type authentication before the second-type authentication, they may be performed in either order. After step 560, method 500 may end.

FIG. 6 illustrates an exemplary multi-factor authentication system 600 consistent with disclosed embodiments. The example system environment of FIG. 6 may be used to implement one or more embodiments of the present disclosure. The components and arrangements shown in FIG. 6 are not intended to limit the disclosed embodiments as the components used to implement the disclosed processes and features may vary.

As shown, system 600 may include the same or similar systems and devices as system 200, and additionally include another user device 250 and a merchant terminal 240. System 600 may be configured to perform some or all steps of methods 200, 300, 400, and 500 as described with respect to system 200, with the added result of authenticating the user to provide access to merchant terminal 240 and/or access to secure content (e.g., a financial account, etc.) via the merchant terminal 240. User device 250 may be configured to directly communicate with other devices/systems of system 600 over network 230. In some examples, user device 250 may also communicate locally (e.g., via a short-range contactless communication interface, a cabled connection, etc.) with mobile device 210. Merchant terminal 240 may be configured to directly communicate with other devices/systems of system 600 over network 230. In some examples, merchant terminal 240 may also communicate locally (e.g., via a cabled connection, a secured alternative network, etc.) with service provider system 200.

Wearable authentication device 100 may include the external features previously described with respect to FIGS. 1A-B. Internally, as shown in greater detail in FIG. 8, wearable authentication device 100 may include one or more processing units 802 that are configured to access a memory 804 having instructions stored thereon. The instructions or computer programs may be configured to perform one or more of the operations or functions described with respect to the device 800. For example, the instructions may be configured to control or coordinate the operation of the various components of the device. Such components include, but are not limited to, display stack 806, one or more input/output components 808, one or more communication channels 810, one or more sensors 812, a speaker 814, microphone 816, one or more haptic feedback devices 818, one or more bio sensors 820, and/or wireless power 822. In some embodiments the speaker and microphone may be combined into a single unit and/or may share a common port through a housing of the device.

The processing units 802 of FIGS. 1A-1B may be implemented as any electronic device capable of processing, receiving, or transmitting data or instructions. For example, the processing units 802 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

Display stack 806 may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments. Display stack may also include one or more touch sensors to determine a location of a touch on the cover glass. The touch sensor may be self-capacitive in certain embodiments, mutual-capacitive in others, or a combination thereof.

Similarly, device 800 may include a force sensor to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

Wearable electronic device 800 may also provide alerts to a user. An alert may be generated in response to: a change in status of the device (one example of which is power running low); receipt of information by the device (such as receiving a message or receiving confirmation from an associated user device indicating that the authentication has been completed); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output. In some embodiments, bio sensor 820 may include one or more sensors configured to detect an sEMG signal (e.g., one or more biosensors 130) when device 800 is in a worn configuration attached to a user's wrist and/or one or more sensors configured to detect other biometrics (e.g., heartbeat, etc.). Wireless power 822 may be a power adaptor configured to provide charge battery 824 of device 800 wirelessly. I/O components 808 may include a first user input 114 and a second user input 116, as shown in more detail with respect to FIGS. 1A-1B, according to an exemplary embodiment.

The example electronic device may communicate with other electronic devices either through a wired connection or wirelessly via communication channels 810. Data may be passed between devices, permitting one device to relay information to another; control another; employ another's sensors, outputs, and/or inputs; and so on. In some embodiments, communication channels 810 may include a short-range contactless communication interface.

Figure 7:
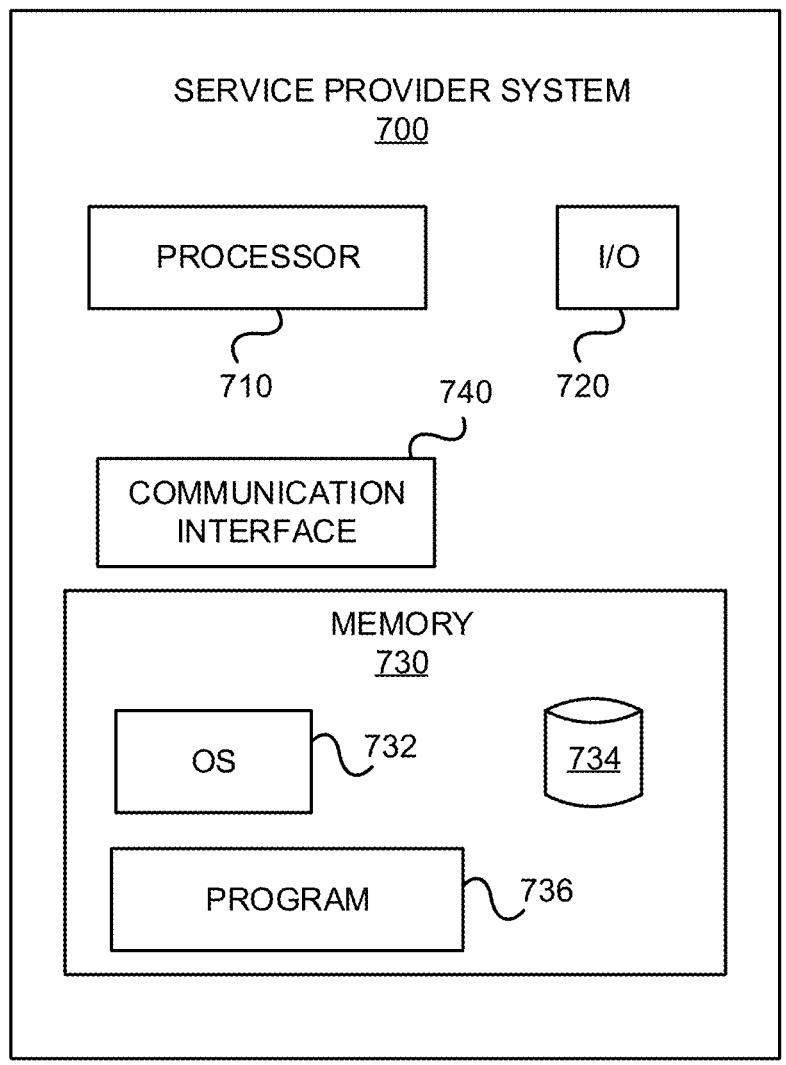
FIG. 7 is a component diagram of an example service provider system consistent with some of the disclosed embodiments.

Returning to FIG. 6, mobile device 210 may have a similar structure and components that are similar to those described with respect to service provider system 220, as shown in more detail in FIG. 7. Additionally, merchant terminal 240, and/or user device 250 may have a similar structure and components that are similar to those described with respect to service provider system 220. Service provider system 220 may include a processor 710, an input/output ("I/O") device 720, a memory 730 containing an operating system ("OS") 732, a program 736, and a database 734. For example, service provider system 700 may be a single server or may be configured as a distributed computer system including multiple servers or computers that interoperate to perform one or more of the processes and functionalities associated with the disclosed embodiments. In some embodiments, service provider system 700 may further include a peripheral interface, a transceiver, a mobile network interface in communication with processor 710, a bus configured to facilitate communication between the various components of the service provider system 700, and a power source configured to power one or more components of service provider system 700. Additionally, service provider system 700 may include a communication interface 740. In some embodiments, the communication interface 740 may be configured to receive and transmit signals over a short-range contactless communication interface. A short-range contactless communication interface may include radio-frequency identification (RFID), near-field communication (NFC), Bluetooth™, low-energy Bluetooth™ (BLE), WiFi™, ZigBee™, and/or ambient backscatter communications (ABC) protocols.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 710 to communicate with other devices via wired or wireless networks, whether local or wide area, private or public, as known in the art. A power source may be configured to provide an appropriate alternating current (AC) or direct current (DC) to power components.

As described above, service provider system 700 may configured to remotely communicate with one or more other devices, such as EMG-based wearable authentication device 100. Processor 710 may include one or more of a microprocessor, microcontroller, digital signal processor, co-processor or the like or combinations thereof capable of executing stored instructions and operating upon stored data. Memory 730 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 730.

Processor 710 may be one or more known processing devices, such as a microprocessor from the Pentium™ family manufactured by Intel™ or the Turion™ family manufactured by AMD™. Processor 710 may constitute a single core or multiple core processor that executes parallel processes simultaneously. For example, processor 710 may be a single core processor that is configured with virtual processing technologies. In certain embodiments, processor 710 may use logical processors to simultaneously execute and control multiple processes. Processor 710 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider system 700 may include one or more storage devices configured to store information used by processor 710 (or other components) to perform certain functions related to the disclosed embodiments. In one example, service provider system 700 may include memory 730 that includes instructions to enable processor 710 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider system 700 may include memory 730 that includes instructions that, when executed by processor 710, perform one or more processes consistent with the functionalities disclosed herein. Methods, systems, and articles of manufacture consistent with disclosed embodiments are not limited to separate programs or computers configured to perform dedicated tasks. For example, service provider system 700 may include memory 730 that may include one or more programs 736 to perform one or more functions of the disclosed embodiments. Moreover, processor 710 may execute one or more programs 736 located remotely from service provider system 700. For example, service provider system 700 may access one or more remote programs 736, that, when executed, perform functions related to disclosed embodiments.

Memory 730 may include one or more memory devices that store data and instructions used to perform one or more features of the disclosed embodiments. Memory 730 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 730 may include software components that, when executed by processor 710, perform one or more processes consistent with the disclosed embodiments. In some embodiments, memory 730 may include an internal database 734 (e.g., for storing authentication training data) to enable service provider system 700 to perform one or more of the processes and functionalities associated with the disclosed embodiments.

Service provider system 700 may also be communicatively connected to one or more memory devices (e.g., databases (not shown)) locally or through a network. The remote memory devices may be configured to store information and may be accessed and/or managed by service provider system 700. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider system 700 may also include one or more I/O devices 720 that may include one or more interfaces for receiving signals or input from devices and providing signals or output to one or more devices that allow data to be received and/or transmitted by service provider system 700. For example, service provider system 700 may include interface components, which may provide interfaces to one or more input devices, such as one or more keyboards, mouse devices, touch screens, track pads, trackballs, scroll wheels, digital cameras, microphones, sensors, and the like, that enable service provider system 700 to receive data from one or more users (e.g., from mobile device 210, user device 250, and/or EMG-based wearable authentication device 100).

In example embodiments of the disclosed technology, service provider system 700 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider system 700 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of service provider system 700 may include a greater or lesser number of components than those illustrated.

Network 230 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Returning to FIG. 6, merchant terminal 240 may include similar structure and components to those described with respect to service provider system 220, as shown in more detail in FIG. 7, and will not be repeated here for brevity. Additionally, merchant terminal 240 may include a financial transaction module configured to allow a user to access a secure financial account and/or make a secure financial transaction once the user has been authenticated by the system (e.g., service provider system 220).

User device 250 may include similar structure and components to those described with respect to service provider system 220, as shown in more detail in FIG. 7, and will not be repeated here for brevity.

Examples of the present disclosure relate to wearable devices and related systems and methods for authenticating a user with surface electromyogram (sEMG) signals. In one aspect, a multi-factor authentication system is disclosed. The system may receive confirmation that a first-type authentication has been completed. The system may receive the confirmation from a user device having a short-range contactless communication connection with a wearable device being worn on an appendage of a user. The system may cause the wearable device to activate at least a first biosensor of the wearable device. The first biosensor may be configured to detect at least a first surface electromyogram (sEMG) signal on the user's skin proximate a first muscle, and occurring in response to a first movement of the first muscle to perform a first gesture (e.g., or the first gesture may be a series of gestures). The system may receive a first user signature from the user device. The first user signature may be generated by the wearable device based on the first sEMG signal. The system may determine whether the first user signature matches stored authentication training data beyond a predetermined confidence threshold. In response to determining that the first user signature matches the stored authentication data beyond a predetermined confidence threshold, the system may complete a second-type authentication to authenticate the user on the user device.

In some embodiments, authenticating the user on the user device allows the user to access secure content on the user device. In other embodiments, authenticating the user allows the user on the user device to access a secure application on the user device. In further embodiments, authenticating the user allows the user on the user device to complete a financial transaction using the user device.

In some embodiments, the wearable device is a smart watch including a body and a strap connected to the body such that the smart watch is secured to a wrist of the user when the smart watch is in a worn configuration. The body may have an outward-facing display and a back face with at least a portion of the back face and at least a portion of the strap collectively forming a contact region that contacts the wrist of the user when the smart watch is in the worn configuration. The first biosensor may extend along the entire contact region when the smart watch is in the worn configuration.

In some embodiments, the first biosensor may extend along a full length of the strap and along a full length of the back face.

In some embodiments, the first user signature is generated by quantizing the first sEMG signal, and the first user signature includes less data than the first sEMG signal.

In some embodiments, the system may be further configured to direct the user device to display a message prompting the user to perform the first gesture. Additionally, the message may illustrate the first gesture.

In some embodiments, the system may be further configured to receive a plurality of confirmed user signatures associated with the user. The plurality of confirmed user signatures may be based on a plurality of quantized sEMG signals. The system may store the plurality of confirmed user signatures as authentication training data. The system may iteratively update the authentication training data to include a respective sEMG signal when the second-type authentication is completed.

In some embodiments, the system may be further configured to selectively adjust the predetermined confidence threshold based on a duration since receipt of a prior sEMG signal associated with the user.

In some embodiments, the first-type authentication includes one or more identifications of a passcode identification, a fingerprint identification, and a facial recognition identification.

In another aspect, a method for authenticating a user to provide access to a secure user device is disclosed. The method may include receiving a first user input associated with a first authentication from the first user device. The method may include determining whether the first user input matches stored first authentication training data beyond a first predetermined confidence threshold. Responsive to determining that the first user input matches the stored first authentication training data beyond the first predetermined confidence threshold, the method may include completing the first authentication and performing a second authentication. The second authentication may include causing at least a first biosensor a wearable user device to activate. The first biosensor may be configured to detect at least a first surface electromyogram (sEMG) signal on the user's skin proximate a first muscle and occurring in response to a first movement of the first muscle to perform a first gesture. The method may include determining whether a first user signature that is generated based on the first sEMG signal matches stored second authentication training data beyond a second predetermined confidence threshold. The method may include, responsive to determining that the first user signature matches the stored second authentication training data beyond the second predetermined confidence threshold completing the secondary authentication to provide access to the user device to the user.

In some embodiments, the wearable user device may include a body and a strap configured to secure the body to an appendage of the user. The first biosensor may extend a full length of the strap.

In some embodiments, the method may further include, responsive to determining that the first user input does not match the stored first authentication training data beyond the predetermined confidence threshold, causing the user device to display a message prompting the user to re-provide the first user input. The method may include, responsive to determining that the first user signature does not match the stored second authentication training data beyond the second predetermined confidence threshold, causing the user device to display a message prompting the user to re-perform the first gesture.

In some embodiments, the wearable user device has a short-range contactless communication connection with the user device.

In some embodiments, determining whether the first user signature matches the stored second authentication training data beyond the second predetermined confidence threshold further comprises receiving the first sEMG signal from the wearable device and quantizing the first sEMG signal to generate the first user signature.

In yet another aspect, a wearable electronic device is disclosed. The wearable electronic device may include a body having an outer-facing surface. The wearable electronic device may include a strap connected to the body and configured to secure the body to an appendage of a user with at least a portion of the strap extending over the user's skin proximate a first muscle. The wearable electronic device may include a first user input sensor including a body portion connected to at least a portion of the body and a strap portion connected to at least a portion of the strap. The strap portion may adjoin the body portion to form a closed circuit, with the strap portion extending along a full length of the strap and the body portion extending a full length of the inner-facing surface. The first user input sensor may further include a biosensor configured to detect a first-type user input for conducting a first-type user authentication. The first-type user authentication may include a first surface electromyogram (sEMG) signal on the user's skin proximate the first muscle that occurs in response to a movement of the first muscle to perform a first gesture. The wearable electronic device may further include a second user input sensor connected to at least a portion of the body. The second user input sensor may be configured to detect a second-type user input for conducting a second-type user authentication that differs from the first-type user authentication. The wearable electronic device may include one or more processors housed in the body, and memory, in communication with the one or more processors, storing instructions that when executed by the one or more processors, are configured to cause the wearable device to perform the following steps. The wearable electronic device may detect the first sEMG signal with the biosensor. The wearable electronic device may generate a first user signature based on the first sEMG signal. The wearable electronic device may provide the first user signature to a user device associated with the user. In response to receiving from the user device an indication that the user signature associated with the first sEMG signal matches a stored user signature beyond a predetermined confidence threshold to complete the first type authentication, the method may include completing the second-type authentication to provide access to the wearable electronic device to the user. Access to the wearable device may be configured to be withheld from the user until completion of the first-type authentication and the second-type authentication.

In some embodiments, the wearable electronic device may further include a short-range contactless communication interface. The wearable user device may be configured to provide the first signature to the user device and receive the indication from the user device via the short-range contactless interface connection.

In some embodiments, the wearable electronic device may, responsive to receiving from the user device an indication that a user signature associated with the first sEMG signal does not match the stored user signature beyond the predetermined confidence threshold, cause the display to show a message prompting the user to re-perform the first gesture.

In some embodiments, the wearable electronic device may further include a heartrate sensor, one or more motion sensors, and be further programmed to cause the heartrate sensor to detect a heartrate of the user. The wearable electronic device may identify one or more predetermined activities that the user is engaged in based at least in part on the detected heartrate. The wearable electronic device may identify one or more known gestures associated with the identified one or more predetermined activities for the user. The wearable electronic device may detect, via the one or more motion sensors, a user movement associated with the identified one or more known gestures. The wearable electronic device may passively cause the biosensor to detect the first sEMG signal responsive to detecting the user movement associated with the identified one or more known gestures and without requiring further action from the user.

In some embodiments, the wearable electronic device may be detachably connected to the body such that when the strap is reattached to the body, the strap portion and the body portion rejoin to form the closed circuit.

Example Use Cases

The following example use cases describe examples of the disclosed devices, systems, and methods for authenticating a user in operation. They are intended solely for explanatory purposes and not to limit the disclosure in any way.

In one exemplary use case, a customer may wish to make a secure purchase at a merchant POS terminal (e.g., merchant POS terminal 240). To provide a higher level of security, the customer may wish for the purchase to be multi-factor authenticated. For example, the customer may set specific criteria for purchases requiring a higher level of security by providing the criteria to a financial service provider with which the customer has an account. For example, a customer may require purchases made by a card transaction for over $500 to be multi-factor authenticated. In some cases, the financial service provider, as part of anti-fraud measures, may require a higher level of security by requiring some transactions to be multi-factor authenticated. For example, the financial service provider may require multi-factor authentication for a transaction occurring in an unexpected geographical area for a respective customer.

Accordingly, a customer making a multi-factor transaction may swipe a payment card (e.g., a payment card associated with the financial service provider) at the merchant POS terminal and enter a secret PIN (i.e., what the customer knows). The system (e.g., service provider system 220) may verify that the entered PIN matches a stored PIN for that customer. If the entered PIN matches the stored PIN, the system may request a second form of authentication using the wearable authentication device 100. For example, a mobile device (e.g., mobile device 210 or user device 250) associated with the wearable authentication device 100, which may be in short-wave contactless communication with the wearable authentication device 100, may provide instructions for the customer to complete a first gesture. In another example, the merchant terminal 240 may provide instructions for the customer to complete a first gesture, which may be one of several predetermined gestures for which the system has stored authentication training data for that customer. In other examples, the customer may perform the first gesture without being prompted, and the system may detect that action without prompting the customer. In response to the customer performing the first gesture, the wearable authentication device 100 may activate the one or more biosensors 130 to detect an sEMG signal generated by the user's muscle(s) proximate the location of the wearable authentication device 100. The system (e.g., wearable device 100 or mobile device 210) may quantize the sEMG signal to generate a first user signature, which provides a unique identifier for the customer based on the performed first gesture. Finally, the system (e.g., service provider system 220) may compare the first user signature to previously stored authentication training data. Responsive to determining that the first user signature matches the previously stored authentication training data, the system (e.g., merchant terminal 240) may approve the secure financial transaction. Additionally, the system may use the provided first user signature to iteratively update the authentication training data in response to the authentication being completed.

In another example, a user of the wearable authentication device may wish to quickly log into/access the wearable authentication device using the biosensor to authenticate himself on the wearable device. For example, the user may have a mobile device (e.g., mobile device 210) within short-range contactless communication with the wearable device (e.g., wearable authentication device 100) which the user is wearing against his/her wrist such that the biosensor is in contact with the user's skin. The user may first provide input to either the wearable device, or optionally, may provide input into the mobile device within communication with the wearable device. The first input may be a first type authentication method, such as a password, PIN, or biometric input other than an sEMG signal (e.g., facial biometric scan, fingerprint biometric scan, etc.). The system (e.g., mobile device 210) may cause the wearable authentication device to activate the biosensor (when not already activated) to detect a sEMG signal associated with a predetermined gesture in response to the system (e.g., service provider system 220, and/or mobile device 210) determining that the first-type authentication has been successfully completed. The biosensor may record a sEMG signal based on the user performing a predetermined gesture, and the system (e.g. wearable authentication device 100, mobile device 210) may determine a user signature based on the sEMG signal. The system (e.g., mobile device 210, wearable authentication device 100, and/or service provider system 220) may determine that the user signature matches stored authentication training data beyond a predetermined confidence threshold, and may give the user access to the wearable authentication device.

In another example, a user may wish to use wearable authentication device to access secure content on another device (e.g., mobile device 210, another user device 250, etc.). For example, the user may first provide input to either the wearable device, or optionally, may provide input into the mobile device within communication with the wearable device (e.g. mobile device 210 or another user device 250). The first input may be a first type authentication method, such as a password, PIN, or biometric input other than an sEMG signal (e.g., facial biometric scan, fingerprint biometric scan, etc.). The system (e.g., mobile device 210) may cause the wearable authentication device to activate the biosensor (when not already activated) to detect an sEMG signal associated with a predetermined gesture in response to the system (e.g., service provider system 220, and/or mobile device 210) determining that the first-type authentication has been successfully completed. The biosensor may record a sEMG signal based on the user performing a predetermined gesture, and the system (e.g. wearable authentication device 100, mobile device 210) may determine a user signature based on the sEMG signal. The system (e.g., mobile device 210, wearable authentication device 100, user device 250, and/or service provider system 220) may determine that the user signature matches stored authentication training data beyond a predetermined confidence threshold, and may give the user access to the associated device (e.g. user device 250 or mobile device 210). In some variations, the user may wish to make an online transaction on an associated device (e.g., user device 250 or mobile device 210) and the system may authenticate the transaction using the wearable authentication device. After the system authenticates the user with a first authentication method for making the online purchase (e.g., verifying a username and password, PIN, credit card number, etc.) the system (e.g., mobile device 210) may cause the wearable authentication device to activate the biosensor to detect an sEMG signal associated with a predetermined gesture. The biosensor may record the an sEMG signal based on the user performing the gesture and determine a user signature based on the sEMG signal. The system may then determine that the user signature matches stored authentication training data beyond a predetermined confidence threshold, and may allow the user to complete the online transaction.

The specific configurations, machines, and the size and shape of various elements can be varied according to particular design specifications or constraints requiring wearable authentication device 100, mobile device 210, user device 250, merchant terminal 240, service provider system 220, system 600, or methods 200, 300, 400, and 500 to be constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain examples and implementations of the disclosed technology are described above with reference to block and flow diagrams of systems and methods and/or computer program products according to example examples or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some examples or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, examples or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multi-factor authentication system comprising:
   one or more processors; and memory in communication with the one or more processors and storing instructions that, when executed by the one or more processors, are configured to cause the system to:
  display, on a display of a wearable device associated with a user, an illustration of a first gesture, wherein the first gesture is a predetermined action performed by the user to authenticate the user;
  cause the wearable device to activate at least a first biosensor of the wearable device, the first biosensor being configured to detect at least a first surface electromyogram (sEMG) signal on the user's skin proximate a first muscle and occurring in response to a first movement of the first muscle to perform the first gesture, wherein the first gesture comprises a change in angle of a hand of the user relative to a forearm of the user;
  receive a first user signature from the user device, the first user signature being generated by the wearable device using a sampling algorithm based on the first sEMG signal in response to the first gesture being performed by the user;
  determine whether the first user signature matches stored authentication training data beyond a predetermined confidence threshold, the stored authentication training data associated with the first gesture; and
  responsive to determining that the first user signature matches the stored authentication training data beyond the predetermined confidence threshold, completing a second-type authentication to authenticate the user on the user device.

2. The system of claim 1, wherein authenticating the user on the user device allows the user to access secure content on the user device.

3. The system of claim 1, wherein authenticating the user allows the user on the user device to access a secure application on the user device.

4. The system of claim 1, wherein authenticating the user allows the user on the user device to complete a financial transaction using the user device.

5. The system of claim 1, wherein:
  the wearable device is a smart watch comprising a body and a strap connected to the body such that the smart watch is secured to a wrist of the user when the smart watch is in a worn configuration;
  the body has an outward-facing display face and a back face, with at least a portion of the back face and at least a portion of the strap collectively forming a contact region that contacts the wrist of the user when the smart watch is in the worn configuration; and
  the first biosensor extends along the entire contact region when the smart watch is in the worn configuration.

6. The system of claim 1, wherein the first biosensor extends along a full length of the strap and along a full length of the back face.

7. The system of claim 1, wherein the first user signature is generated by quantizing the first sEMG signal, and the first user signature includes less data than the first sEMG signal.

8. The system of claim 1, further comprising instructions that, when executed by the one or more processors, are configured to cause the system to direct the user device to display a message prompting the user to perform the first gesture.

9. The system of claim 8, wherein the first gesture comprises a sequence of gestures.

10. The system of claim 1, wherein the message illustrates the first gesture.

11. The system of claim 1 further comprising instructions that, when executed by the one or more processors, are configured to cause the system to:
  receive a plurality of confirmed user signatures associated with the user, the plurality of confirmed user signatures being based on a plurality of quantized sEMG signals;
  storing the plurality of confirmed user signatures as authentication training data; and
  iteratively updating the authentication training data to include a respective sEMG signal when the second-type authentication is completed.

12. The system of claim 1 further comprising instructions that, when executed by the one or more processors, are configured to cause the system to selectively adjust the predetermined confidence threshold based on a duration since receipt of a prior sEMG signal associated with the user.

13. The system of claim 1, wherein the first-type authentication comprises one or more identifications of a passcode identification, a fingerprint identification, and a facial recognition identification.

14. A method for authenticating a user to provide access to a secure user device, the method comprising:
  receiving a first user input associated with a first authentication from the user device;
  determining whether the first user input matches stored first authentication training data beyond a first predetermined confidence threshold;
  responsive to determining that the first user input matches the stored first authentication training data beyond the first predetermined confidence threshold, completing the first authentication and performing a second authentication comprising:
    displaying, on a display of the user device, an illustration of a first gesture, wherein the first gesture is a predetermined action performed by the user to authenticate the user;
    causing at least a first biosensor of a wearable user device to activate, the first biosensor being configured to detect at least a first surface electromyogram (sEMG) signal on the user's skin proximate a first muscle and occurring in response to a first movement of the first muscle to perform the first gesture, wherein the first gesture comprises a change in angle of a hand of the user relative to a forearm of the user;
    determining whether a first user signature that is generated based on the first sEMG signal using a sampling algorithm matches stored second authentication training data beyond a second predetermined confidence threshold, the stored second authentication training data associated with prior performances of the first gesture by the user; and
    responsive to determining that the first user signature matches the stored second authentication training data beyond the second predetermined confidence threshold, completing the secondary authentication to provide access to the user device to the user.

15. The method of claim 14, wherein the wearable user device comprises a body and a strap configured to secure the body to an appendage of the user, and the first biosensor extends a full length of the strap.

16. The method of claim 14 further comprising:
  responsive to determining that the first user input does not match the stored first authentication training data beyond the first predetermined confidence threshold, causing the user device to display a message prompting the user to re-provide the first user input; and
responsive to determining that the first user signature does not match the stored second authentication training data beyond the second predetermined confidence threshold, causing the user device to display a message prompting the user to re-perform the first gesture.

17. The method of claim 14, wherein the wearable user device has a short-range contactless communication connection with the user device.

18. The method of claim 14, wherein determining whether the first user signature matches the stored second authentication training data beyond the second predetermined confidence threshold further comprises:
receiving the first sEMG signal from the wearable device; and
quantizing the first sEMG signal to generate the first user signature.

19. A wearable electronic device comprising:
a body having an outer-facing surface configured to emit arrangements of lights to form a display and an inner-facing surface opposite the outer-facing surface;
a strap connected to the body and configured to secure the body to an appendage of a user with at least a portion of the strap extending over the user's skin proximate a first muscle;
a first user input sensor comprising a body portion connected to at least a portion of the body and a strap portion connected to at least a portion of the strap, the strap portion adjoining the body portion to form a closed circuit, the strap portion extending along a full length of the strap and the body portion extending a full length of the inner-facing surface, wherein the first user input sensor further comprises a biosensor configured to detect a first-type user input for conducting a first-type user authentication, the first-type user input comprising a first surface electromyogram (sEMG) signal on the user's skin proximate the first muscle that occurs in response to a movement of the first muscle to perform a first gesture, wherein the first gesture comprises a change in angle of a hand of the user relative to a forearm of the user;
a second user input sensor connected to at least a portion of the body, the second user input sensor being configured to detect a second-type user input for conducting a second-type user authentication that differs from the first-type user authentication;
one or more processors housed in the body; and
memory, in communication with the one or more processors, and storing instructions that, when executed by the one or more processors, are configured to cause the wearable electronic device to:
display, on the display, an illustration of the first gesture, wherein the first gesture is a predetermined action performed by the user to authenticate the user;
detect the first sEMG signal with the biosensor in response to the user performing the first gesture;
generate a first user signature using a sampling algorithm based on the first sEMG signal;
provide the first user signature to a user device associated with the user;
responsive to receiving, from the user device, an indication that the user signature associated with the first sEMG signal matches a stored user signature beyond a predetermined confidence threshold, the stored user signature associated with the first gesture, complete the second-type authentication to provide access to the wearable electronic device to the user, wherein access to the wearable electronic device is configured to be withheld from the user until completion of the first-type authentication and the second-type authentication.

20. The wearable electronic device of claim 19 further comprising a short-range contactless communication interface, wherein the wearable user device is configured to provide the first signature to the user device and receive the indication from the user device via a short-range contactless communication interface connection.

21. The wearable electronic device of claim 19 further comprising instructions that, when executed by the one or more processors, are configured to cause the wearable electronic device to:
responsive to receiving, from the user device, an indication that a user signature associated with the first sEMG signal does not match the stored user signature beyond the predetermined confidence threshold, cause the display to show a message prompting the user to re-perform the first gesture.

22. The wearable electronic device of claim 19 further comprising a heartrate sensor, one or more motion sensors, and instructions that, when executed by the one or more processors, are configured to cause the wearable electronic device to:
cause the heartrate sensor to detect a heartrate of the user;
identify one or more predetermined activities that the user is engaged in based at least in part on the detected heartrate;
identify one or more known gestures associated with identified one or more predetermined activities for the user;
detect, via the one or more motion sensors, a user movement associated with the identified one or more known gestures; and
passively cause the biosensor to detect the first sEMG signal responsive to detecting the user movement associated with the identified one or more known gestures and without requiring further action from the user.

23. The wearable electronic device of claim 19, wherein the strap is detachably connected to the body such that when the strap is reattached to the body, the strap portion and the body portion rejoin to form the closed circuit.

* * * * *